(12) United States Patent
Brown et al.

(10) Patent No.: US 6,698,675 B2
(45) Date of Patent: Mar. 2, 2004

(54) LEADER BLOCK ASSEMBLY WITH SNAP-IN FEATURE FOR A DATA STORAGE TAPE CARTRIDGE

(75) Inventors: Jerome D. Brown, Wahpeton, ND (US); Dean E. Sitz, Wahpeton, ND (US); Jerry L. Alexander, St. Paul Park, MN (US); Arne B. Boberg, Shoreview, MN (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 10/024,842

(22) Filed: Dec. 18, 2001

(65) Prior Publication Data
US 2003/0111570 A1 Jun. 19, 2003

(51) Int. Cl.[7] ............................................... B65H 23/07
(52) U.S. Cl. .................................................... 242/348.2
(58) Field of Search ............................. 242/348.2, 580, 242/580.1, 332, 332.4, 586.2; 226/92; 360/95

(56) References Cited

U.S. PATENT DOCUMENTS

| | | | |
|---|---|---|---|
| 4,290,562 A | * | 9/1981 | Sasaki et al. ............ 242/586.2 |
| 4,436,253 A | * | 3/1984 | Watanabe ................. 242/586.2 |
| 5,303,875 A | | 4/1994 | Hoge et al. |
| 5,465,187 A | | 11/1995 | Hoge et al. |
| 5,647,551 A | * | 7/1997 | Ikeda et al. ................... 242/345 |
| 6,014,293 A | * | 1/2000 | Casey et al. ................. 360/132 |
| 6,092,762 A | * | 7/2000 | Aaron .......................... 242/899 |
| 6,311,916 B1 | | 11/2001 | Johnson et al. |

FOREIGN PATENT DOCUMENTS

JP 08147803 A * 6/1996 ........... G11B/15/07

* cited by examiner

Primary Examiner—Kathy Matecki
Assistant Examiner—Scott J. Haugland
(74) Attorney, Agent, or Firm—Eric D. Levinson (57) ABSTRACT

A leader block assembly including a leader block, a tape clamp, and an elastomeric member. The leader block forms a channel defined by opposing sidewalls extending from a base, each sidewall forming a lip having an under surface. The tape clamp is nested within the channel and includes a bottom surface, opposing sides, and at least one cantilevered leg positioned at each of the opposing sides, respectively. Each leg extends upwardly relative to the bottom surface. The elastomeric member is disposed between the leader block and the tape clamp, and biases the tape clamp to a locked position in which the legs engage the under surface of the respect lips providing positive engagement between the tape clamp and the leader block.

20 Claims, 5 Drawing Sheets

LEADER BLOCK ASSEMBLY WITH SNAP-IN FEATURE FOR A DATA STORAGE TAPE CARTRIDGE

BACKGROUND OF THE INVENTION

The present invention relates to a leader block assembly for a data storage tape cartridge. More particularly, it relates to a leader block assembly including a tape clamp configured to positively engage a leader block for consistently securing a storage tape.

Data storage tape cartridges have been used for decades in the computer, audio, and video fields. The data storage tape cartridge continues to be an extremely popular form of recording large volumes of information for subsequent retrieval and use.

Data storage tape cartridges generally consist of an outer shell or a housing maintaining at least one tape reel assembly and a length of magnetic storage tape. The storage tape is wrapped about a hub portion of the tape reel assembly and is driven through a defined tape path by a separate driving system. The housing normally includes a separate cover and base, the combination of which forms an opening (or window) at a forward portion thereof for allowing access to the storage tape by a read/write head upon insertion of the data storage tape cartridge into a tape drive.

In a reel-to-reel magnetic tape drive, a free end of the storage tape is directed away from the cartridge housing to an adjacent area within the tape device at which the read/write head is located. The free end of the storage tape is typically secured to a leader block assembly to assist in guiding the storage tape from the housing. In particular, the leader block assembly is removably inserted into a drive take-up reel (separate from the data storage tape cartridge), and the storage tape from the cartridge is wound about the take-up reel as data is accessed/recorded from the tape by the adjacent read/write head.

Most leader block assemblies include a leader block and a tape clamp. The leader block provides the requisite features for proper take-up reel engagement, as well as desired attachment to the cartridge housing at the window when not in use. Further, the leader block forms a channel within which the tape clamp is nested, with the free or leading end of the storage tape being secured between the tape clamp and the leader block. Thus, the tape clamp must lock to the leader block to consistently maintain engagement with the storage tape when the leader block assembly is "pulled" from the cartridge housing by the tape drive.

A prevailing leader block assembly design achieves the desired interlocking relationship between the tape clamp and leader block by forming locking tabs on opposing sides of the tape clamp. Similarly, the leader block forms slots designed to receive the locking tabs. One example of this technique is illustrated in U.S. Pat. No. 5,303,875, the teachings of which are incorporated herein by reference. Additional features may be incorporated into the leader block assembly to promote alignment between the leader block and the tape clamp. However, the locking tabs are the primary feature used to secure the tape clamp to the leader block.

While viable, the locking tab technique raises certain concerns. In particular, assembly of the tape clamp to the leader block generally entails positioning the tape clamp above the channel and then pressing the two components toward one another. In this regard, the leader block sidewalls (otherwise defining the channel and forming the tab-receiving slots) will, in theory, deflect slightly outwardly along the locking tabs until the tape clamp is located within the channel. At this point, the sidewalls return to a natural the unloaded position, with the locking tabs positioned within the respective slots. Unfortunately, sufficient sidewall deflection may not occur, causing the locking tabs to permanently deform (i.e., exceed their elastic limit or otherwise "crush") so that upon final assembly, the locking tabs no longer provide desired surface area engagement within the slot. Additionally, interaction between the locking tabs and the leader block does not provide a positive lock or engagement. In particular, the slot engagement surface is non-planar relative to the engagement surface of the locking tab and/or the above-described locking tab deformation prevents uniform engagement from occurring. As a result, the tape clamp may not be uniformly locked to the leader block. Further, control over an overall thickness of the leader block assembly may be difficult to achieve in that a precise position of the tape clamp relative to the leader block can vary depending upon the extent of locking tab deformation. This potential deviation from a desired design parameter may, in turn, lead to handling issues within the cartridge housing and/or the take-up reel.

Current leader block assembly designs are highly sufficient for current data storage tape cartridge applications. However, the potential inconsistencies in mounting of the tape clamp to the leader block may give rise to future complications. As such, a need exists for a leader block assembly adapted to positively secure a storage tape on a uniform basis.

SUMMARY OF THE INVENTION

One aspect of the present invention relates to a leader block assembly for holding an end of a storage tape. The leader block assembly includes a leader block, a tape clamp, and an elastomeric member. The leader block defines a leading section and a trailing section forming a channel defined by opposing sidewalls extending from a base. In this regard, each of the opposing sidewalls forms a lip opposite the base, with each lip having an under surface. The tape clamp is nested within the channel and includes a bottom surface, opposing sides, and at least one cantilevered leg positioned at each of the opposing sides, respectively. In this regard, each of the legs extends upwardly relative to the bottom surface. Finally, the elastomeric member is disposed between the leader block and the tape clamp, and is provided to bias the tape clamp to a locked state in which the legs engage the under surface of the respect lips. By providing cantilevered legs, assembly of the tape clamp to the leader block does not result in a permanent deformation of the assembly components, thereby facilitating a positive engagement between the tape clamp and the leader block. In one preferred embodiment, each of the legs extends in an angularly outward fashion, thereby defining a free end that is transversely offset from a corresponding fixed end.

Another aspect of the present invention relates to a data storage tape cartridge. The data storage tape cartridge includes a housing, at least one tape reel assembly, a storage tape, and a leader block assembly. The housing defines an enclosure. The tape reel is disposed within the enclosure and includes a hub. The storage tape is wound about the hub. Finally, the leader block assembly is secured to a leading end of the storage tape. In this regard, the leader block assembly includes a leader block, a tape clamp, and an elastomeric member. The leader block defines a leading section and a trailing section, with the trailing section forming a channel. In particular, the channel is defined by opposing sidewalls extending from a base. Further, each of the sidewalls forms a lip opposite the base, with each lip having an under surface. The tape clamp is nested within the channel and includes a bottom surface, opposing sides, and at least one cantilevered leg positioned at each of the opposing sides, respectively. In this regard, each leg extends upwardly relative to the bottom surface. Finally, the elastomeric member is disposed between the leader block and the tape clamp for biasing the tape clamp to a locked state in which the legs positively engage the under surface of the respective lip. In one preferred embodiment, the leading end of the tape is affixed between the elastomeric member and the leader block.

Yet another aspect of the present invention relates to a method of assembling a leader block assembly for securing a leading end of a storage tape. The method includes providing a leader block forming a channel defined by opposing sidewalls extending from a base, each of the sidewalls forming a lip opposite the base and having an under surface. A tape clamp is provided that includes a central body defining a bottom surface and opposing sides. Further, the tape clamp includes at least one cantilevered leg extending upwardly relative to the bottom surface at each of the respective sides. An elastomeric member is further provided. The elastomeric member is positioned at the bottom surface of the tape clamp. The tape clamp is positioned adjacent the channel. The tape clamp is directed into the channel. In particular, the bottom surface of the tape clamp is directed toward the base of the leader block. In this regard, the legs deflect inwardly along the lips from an unloaded or free position as the tape clamp is directed into the channel. A final assembly position is achieved in which the tape clamp is nested within the channel and the legs elastically return to the unloaded position. In the final assembly position, the elastomeric member biases the tape clamp to a locked state in which the legs engage the under surface of the respective lip. With this technique, and unlike previous designs, the tape clamp components, and in particular the cantilevered legs, are not permanently deformed such that a positive lock is achieved between the tape clamp and the leader block.

DESCRIPTION OF THE PREFERRED EMBODIMENTS

Figure 1:
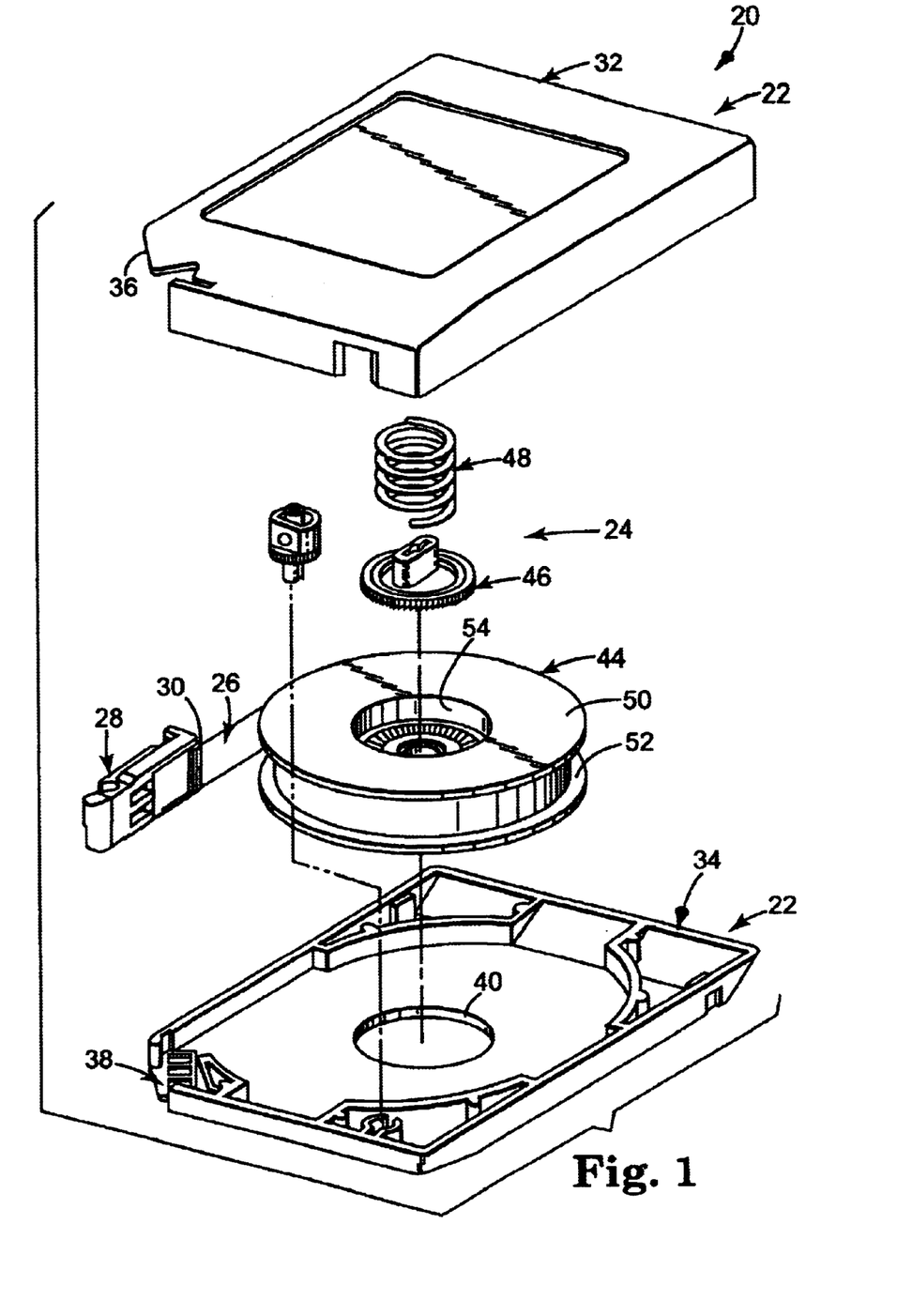
FIG. 1 is an exploded, perspective view of a data storage tape cartridge in accordance with the present invention.

One preferred embodiment of a data storage tape cartridge 20 in accordance with the present invention is shown in FIG. 1. Generally speaking, the data storage tape cartridge includes a housing 22, a tape reel assembly 24, a storage tape 26, and a leader block assembly 28. The tape reel assembly 24 is disposed within the housing 22. The storage tape 26, in turn, is wound about the tape reel assembly 24 and includes a leading end 30 attached to the leader block assembly 28.

The housing 22 is preferably sized to be received by a typical tape drive (not shown). Thus, the housing 22 can assume a form factor size of approximately 125 mm×110 mm×21 mm, although other form factors or dimensions are equally acceptable. With this in mind, the housing 22 is preferably defined by a first housing section 32 and a second housing section 34. In one preferred embodiment, the first housing section 32 forms a cover, whereas the second housing section 34 serves as a base. As used throughout the specification, directional terminology, such as "cover," "base," "upper," "lower," "top," "bottom," etc., are used for purposes of illustration only, and are in no way limiting.

The first and second housing sections 32, 34 are configured to be reciprocally mated to one another and are generally rectangular except for one corner 36 that is preferably angled and forms a leader block window 38. The leader block window 38 is configured to hold the leader block assembly 28 and serves as an opening for the storage tape 26 to exit from the housing 22 such that the storage tape 26 can be threaded to a tape drive (not shown) when the leader block assembly 28 is removed from the leader block window 38. Conversely, when the leader block assembly 28 is snapped into the leader block window 38, the leader block window 38 is covered.

In addition to the leader block window 38, the second housing section 34 further forms a central opening 40. The central opening 40 facilitates access to the tape reel assembly 24 by a drive chuck portion of a tape drive (not shown).

The tape reel assembly 24 is of a type known in the art and generally includes a tape reel 44, a brake 46, and a spring 48. The tape reel 44 includes an upper flange 50, a lower flange 52 and a ring-shaped hub 54, and is sized to coaxially receive the brake 46 and the spring 48. The storage tape 26 is wound about the hub 54, constrained laterally by the flanges 50, 52. As is known in the art, the brake 46 and the spring 48 selectively "lock" the tape reel 44 to the housing 22 when the cartridge 20 is not in use.

The storage tape 26 is preferably a magnetic tape of a type commonly known in the art. For example, the storage tape 26 may consist of a balanced polyethylene naphthalate (PEN) based material coated on one side with a layer of magnetic material dispersed within a suitable binder system and on the other side with a conductive material dispersed within a suitable binder system. Acceptable magnetic tape is available, for example, from Imation Corp., of Oakdale, Minn.

Figure 2:
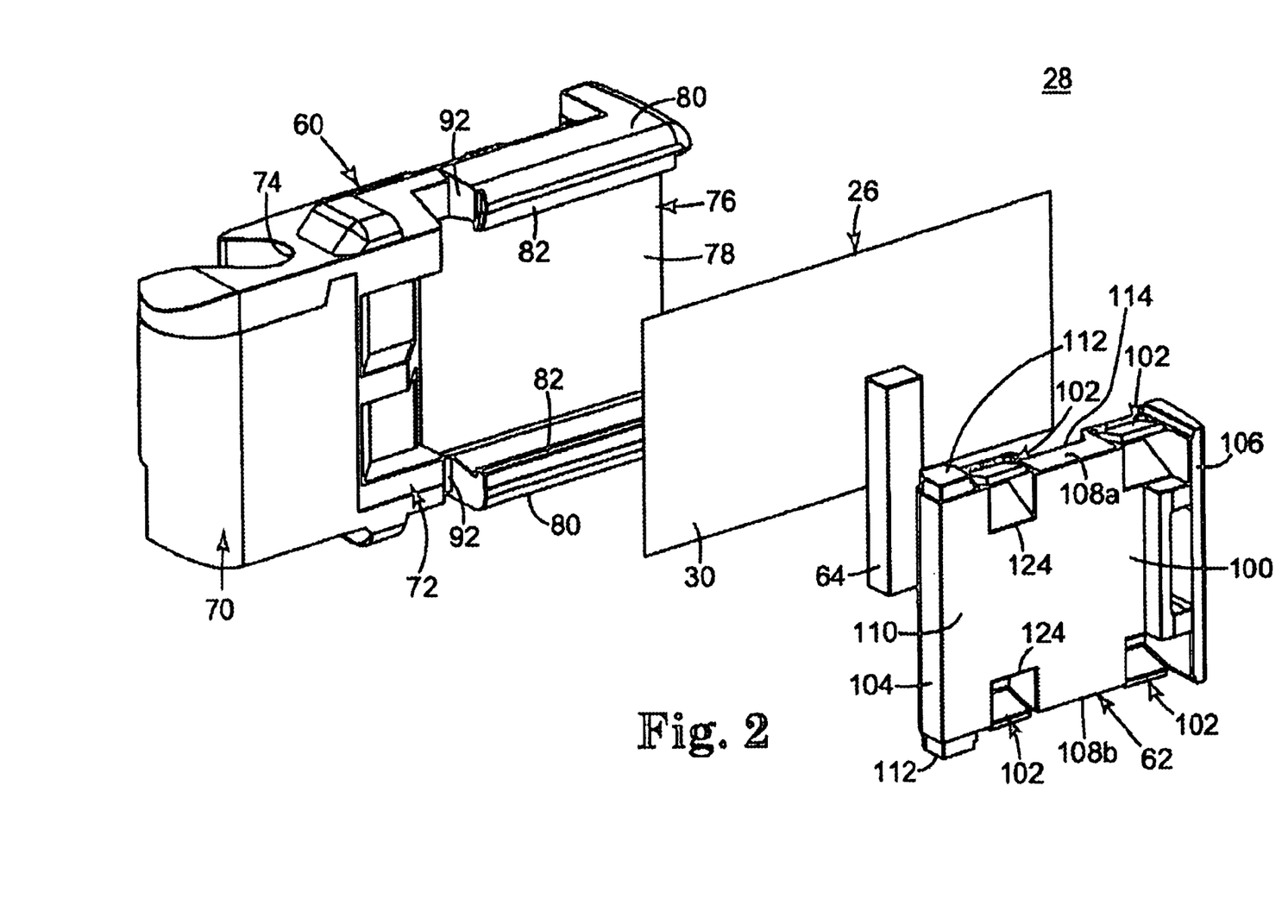
FIG. 2 is an exploded, perspective view of a leader block assembly in accordance with the present invention in conjunction with a portion of a storage tape.

The leader block assembly 28 is shown in greater detail in FIG. 2, in conjunction with the leading end 30 of the storage tape 26. The leader block assembly 28 includes a leader block 60, a tape clamp 62, and an elastomeric member 64. The various components are described in greater detail below. In general terms, however, the tape clamp 62 is assembled to the leader block 60 in a locked state, whereby the leading end 30 of the storage tape 26 is secured therebetween. The elastomeric member 64 is disposed between the leader block 60 and the tape clamp 62, biasing the tape clamp 62 to uniformly maintain the locked state.

The leader block 60 generally defines a leading section 70 and a trailing section 72. The leading section 70 is configured to facilitate engagement with a take-up reel (not shown) and thus, for example, forms a slot 74. The trailing section 72 is similarly adapted to facilitate handling by the take-up reel as well as to facilitate engagement within the leader block window 38 (FIG. 1). In addition, the trailing section 72 forms a channel 76 (referenced generally in FIG. 2) defined by a base 78 and opposing sidewalls 80. The opposing sidewalls 80 extend from the base 78, and each form a lip 82 opposite the base 78.

Figure 3:
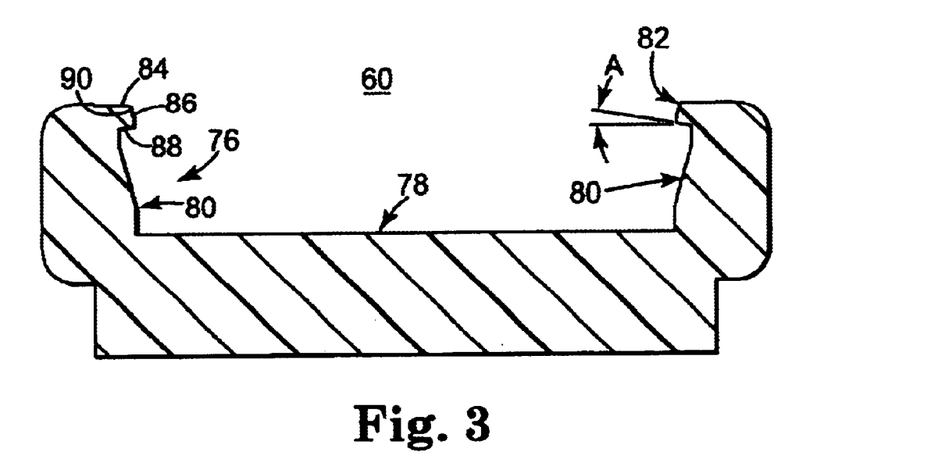
FIG. 3 is a cross-sectional view of a leader block portion of the assembly of FIG. 2.

With additional reference to the cross-sectional view of FIG. 3, each lip 82 defines an outer surface 84, a guide surface 86, and an under surface 88. As described in greater detail below, the guide surface 86 includes a tapered portion 90 configured to facilitate assembly of the tape clamp 62. The under surface 88 is configured to provide positive engagement with a corresponding component of the tape clamp 62 as described in greater detail below. In this regard, and relative to the transverse cross-sectional view of FIG. 3, the base 78 defines a planar surface of the channel 76. The under surface 88 is preferably oriented to be non-planar relative to a plane of the base 78. This non-planar orientation corresponds with a related component of the tape clamp 62, and promotes desired interaction between the leader block 60 and the tape clamp 62. In one preferred embodiment, a plane of the under surface 88 and a plane of the base 78 (relative to the transverse cross-sectional view of FIG. 3) combine to define an included angle in the range of 5°–15°, more preferably 10°. Stated otherwise, relative to a horizontal plane defined by the base 78, the under surface 88 forms an angle A in the range of 5–15°, more preferably 10°.

As best shown in FIG. 2, the trailing section 72 preferably further forms opposing recesses 92 adjacent the opposing sidewalls 80. As described in greater detail below, the recesses 92 are configured to receive corresponding components of the tape clamp 62, thereby dictating a desired position of the tape clamp 62 relative to the leader block 60. Alternatively, other positioning techniques are equally acceptable.

The leader block 60 is preferably integrally formed from a rigid material. In one preferred embodiment, the leader block 60 is molded glass-filled polycarbonate, although other materials and manufacturing techniques are also acceptable.

The tape clamp 62 includes a central body 100 and a plurality of cantilevered legs 102 (referenced generally in FIG. 2). The central body 100 defines a leading end 104, a trailing end 106 (partially hidden in FIG. 2), opposing sides 108a, 108b, a top surface 110, and a bottom surface (hidden in FIG. 2). In one preferred embodiment, the central body 100 further forms feet 112a, 112b projecting outwardly from the opposing sides 108a, 108b, respectively, adjacent the leading end 104. The feet 112a, 112b are configured to be received within the recesses 92, respectively, otherwise formed by the leader block 60. Once again, other alignment techniques are equally acceptable, such that only one of the feet 112a, 112b need be provided and/or an alternative alignment technique employed. Finally, the central body 100 preferably forms a slot 114 at the bottom surface, and extending across a width thereof As described in greater detail below, the slot 114 is preferably sized to receive the elastomeric member 64.

The legs 102 are each formed to extend from the central body 100 upwardly relative to the bottom surface (not shown). In the preferred embodiment of FIG. 2, four of the legs 102 are provided, with a pair of legs 102 being associated with each of the opposing sides 108. Alternatively, any other number of legs can be provided. With the preferred embodiment, however, the pairs of legs 102 are symmetrically oriented relative to the opposing sides 108a, 108b and are positioned at opposite sides of the slot 114 along the respective sides 108a, 108b.

Figure 4:
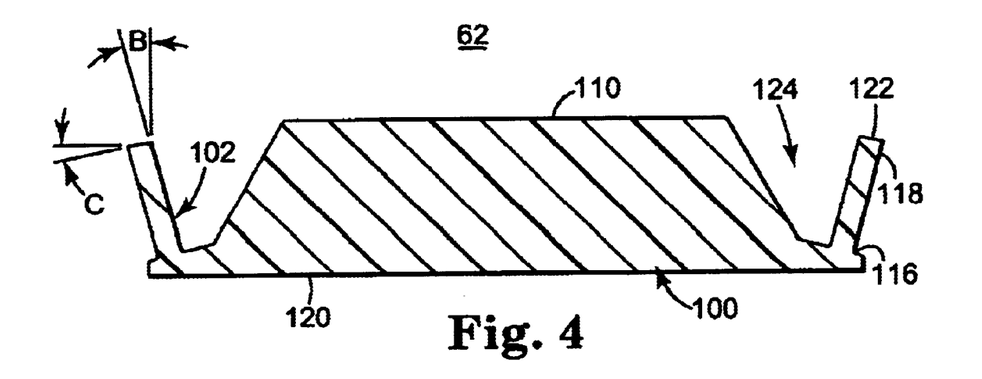
FIG. 4 is a cross-sectional view of a tape clamp portion of the assembly of FIG. 2.

With additional reference to FIG. 4, each leg 102 is defined by a fixed end 116 and a free end 118. The fixed end 116 is attached to the central body 100. In addition to extending upwardly relative to the bottom surface 120, each leg 102 extends angularly outwardly relative to the central body 100. Thus, relative to the transverse cross-sectional view of FIG. 4, the free end 118 is transversely spaced outwardly relative to the fixed end 116. Further, each leg 102 is configured to be elastically deflectable from an unloaded or free position otherwise illustrated in FIG. 4. More particularly, when subjected to an inward force, each of the legs 102 will readily deflect inwardly, but will elastically return to the unloaded position upon removal of the force. In this way, then, the legs 102 effectively serve as snap-in devices for assembly of the tape clamp 62 to the leader block 60 as described in greater detail below.

The preferred elastic nature of the legs 102 can be achieved in a variety of ways, but is preferably a function of a construction of the legs 102. In one preferred embodiment, then, each of the legs 102 has a thickness (shown in FIG. 4) in the range of 0.005–0.025 inch, more preferably 0.016 inch. Further, the angular outward extension of the legs 102 is preferably less than approximately 30°. More particularly, relative to the orientation of FIG. 4, the bottom surface 120 defines a horizontal plane of the tape clamp 62. Notably, the plane of the bottom surface 120 corresponds with a plane defined by the base 78 of the leader block 60 (FIG. 3). Regardless, with this designation in mind, an angular extension of each of the legs 102 can be defined with reference to a vertical plane that is otherwise perpendicular to the horizontal plane defined by the bottom surface 120. In particular, each of the legs 102 extends at an angle B relative to the vertical plane. In a preferred embodiment, the angle B is in the range of 5–30°, more preferably 15°. Finally, each of the legs 102 preferably has a linear length in the range of 0.06–0.1 inch, more preferably 0.083 inch. With these preferred dimensions in mind, and in combination with an appropriate material used for the tape clamp 62 (i.e., preferably molded acetal), the legs 102, and in particular, the free ends 118, can be deflected transversely inwardly a distance on the order of 0.01 inch, and elastically return to the orientation shown.

The free end 118 of each of the legs 102 defines an engagement surface 122 configured to contact the under surface 88 (FIG. 3) of the leader block 60 upon final assembly. In this regard, the engagement surface 122 is configured to be aligned with, or co-planar to, the respective under surface 88 upon final assembly. In this regard, the bottom surface 120 is configured to be co-planar with a plane defined by the base 78 of the leader block 60 as previously described. Thus, the engagement surface 122, in turn, is preferably non-planar relative to the bottom surface 120 in transverse cross-section.

In one preferred embodiment, the bottom surface 120 and the engagement surface 122 combine to define an included angle in the range of 5°–15°, more preferably 10°. Stated otherwise, and with specific reference to FIG. 4, the engagement surface 122 forms an angle C relative to a horizontal plane (that is otherwise co-planar with the bottom surface 120) in the range of 5°–15°, more preferably 10°. Regardless, an orientation of the engagement surface 122 relative to the bottom surface 120 preferably corresponds with an orientation of the under surface 88 (FIG. 3) relative to the base 78 (FIG. 3).

To facilitate the desired inward deflection of the legs 102, the central body 100 forms a cavity 124 in the region of each of the respective legs 102. Each cavity 124 is appropriately sized such that the central body 100 will not impede desired deflection of the corresponding leg 102. Notably, the cavities 124 illustrated in the various Figures are larger than otherwise necessary for proper functioning of the leader block assembly 28 (i.e. leg 102 deflection). The cavities 124 are preferably enlarged to provide adequate steel strength for the mold used in the manufacture of the tape clamp 62.

Returning to FIG. 2, the elastomeric member 64 is preferably an elongated, low stiffness elastic pad sized to be received within the slot 114 otherwise defined by the tape clamp 62. In a preferred embodiment, the elastomeric member 64 further includes an adhesive coating (not shown) provided to enhance engagement between the elastomeric member 64 and the tape clamp 62. Regardless, the elastomeric member 64 is preferably formed of an elastomeric material (preferably polyurethane, although other materials such as silicone rubber are also acceptable) that is configured to be compressible from an unloaded thickness while exhibiting an appropriate durometer whereby the elastomeric member 64 generates an outward expansion force when compressed. In one preferred embodiment, the elastomeric member 64 is provided as a block polymeric material from 3M Company of Saint Paul, Minn. under Product Designation No. SJD16 and has a height in the range of 0.02–0.10 inch, more preferably 0.06 inch, and a preferred durometer in the range of 20–60. As a point of reference, in one preferred embodiment, the elastomeric member 64 has a height of 0.06 inch and is compressed to a height of approximately 0.048 inch upon final assembly. Alternatively, other dimensions otherwise related to a design of the leader block 60 and the tape clamp 62 are acceptable.

A preferred method of assembling the leader block assembly 28 includes positioning the elastomeric member 64 within the slot 114 defined by the tape clamp 62. The leading end 30 of the storage tape 26 is positioned within the channel 76 defined by the leader block 60. In particular, the leading end 30 is placed on the base 78. The tape clamp 62 is then positioned adjacent the channel 76 such that the bottom surface 120 (FIG. 4) faces the base 78. The feet 112 are located within the respective recesses 92, thereby properly aligning the leader block 60 and the tape clamp 62. The tape clamp 62 is then forced toward the leader block 60, such that the tape clamp 62 is directed into the channel 76. In this regard, the legs 102 will initially contact the guide surface 86 of the corresponding lip 82. As the tape clamp 62 is further forced into the channel 76, the legs 102 will deflect inwardly via interaction with a respective guide surface 86. This inward deflection continues until the free end 118 "clears" the corresponding lip 82, with the legs 102 then elastically returning to the unloaded or free position. To ensure that the legs 102 return to their unloaded orientation, the tape clamp 62 is preferably "over driven" into the leader block 60 (e.g., pressed into the channel 76 beyond a position achieved upon final assembly and removal of the external force). In this regard, and as described in greater detail below, the leader block 60 and the tape clamp 62 are preferably configured to provide sufficient clearance for this "over driven" operation, as well as to minimize the potential for impressions being formed on the storage tape 26.

Figure 5:
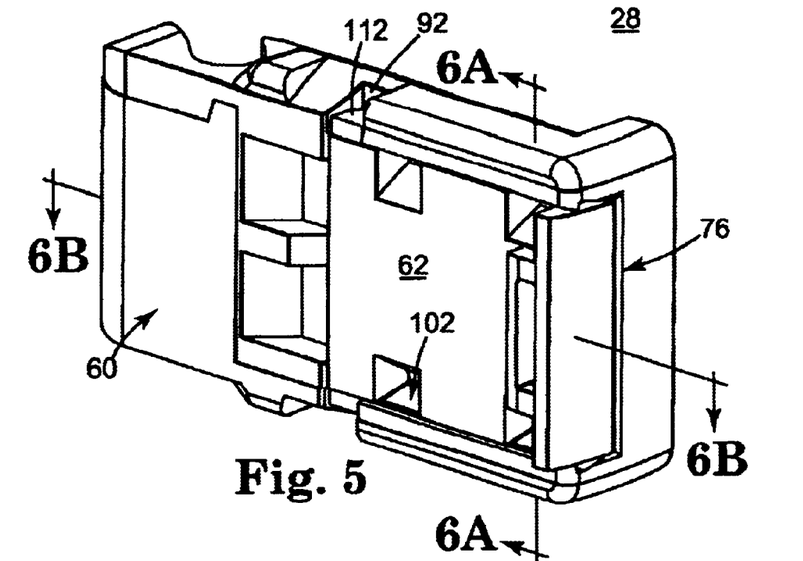
FIG. 5 is a perspective view of the leader block assembly of FIG. 2 upon final assembly.
Figure 6A:
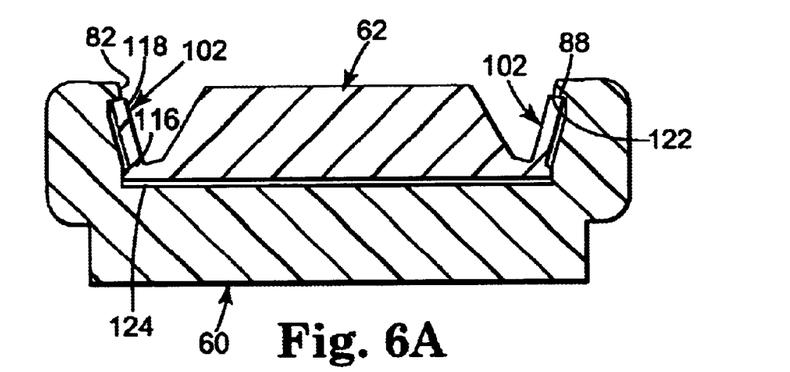
FIG. 6A is a cross-sectional view of the leader block assembly of FIG. 5 along the line 6A—6A.

Final assembly of the tape clamp 62 to the leader block 60 is shown in FIG. 5. The feet 112 are positioned within the corresponding recesses 92 of the leader block 60 such that the tape clamp 62 is desirably positioned relative to the leader block 60. Further, the legs 102 have returned to their unloaded position, and have engaged the corresponding lips 82. This relationship is best shown in FIG. 6A, whereby the engagement surface 122 of each of the legs 102 is engaged with a corresponding under surface 88 provided by the leader block 60. In this locked state, the under surface 88 and the engagement surface 122 are aligned or otherwise co-planar, thereby providing an enhanced area of interface. That is to say, the free end 118 of each leg 102 contacts the under surface 88 at more than a single point. FIG. 6A further illustrates a preferred clearance 124 between the leader block 60 and the tape clamp 62. Once again, this preferred feature facilitates proper assembly of the two components 60, 62, whereby the tape clamp 62 is "over driven" into the leader block 60 (relative to the final spacing shown in FIG. 6A) to allow the legs 102 to clear the corresponding lips 82.

Figure 6B:
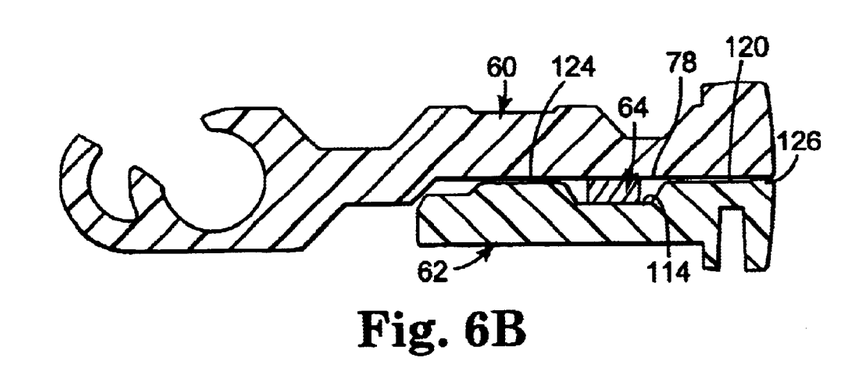
FIG. 6B is a cross-sectional view of the leader block assembly of FIG. 5 along the line 6B—6B.

With additional reference to FIG. 6B, the elastomeric member 64 biases the tape clamp 62 to the locked state relative to the leader block 60. In particular, the elastomeric member 64 is compressed as the tape clamp 62 is forced into the channel 76 defined by the leader block 60. After the legs 102 have returned to the unloaded position and the external force removed from the tape clamp 62, the elastomeric member 64 imparts an outward expansion force on the leader block 60 and the tape clamp 62. Thus, the elastomeric member 64 forces the bottom surface 120 of the tape clamp 62 away from the base 78 of the leader block 60, ensuring positive engagement or interface between the legs 102, and in particular the engagement surface 122, and the under surface 88 of the corresponding lip 82. Notably, because this positive engagement is achieved without any permanent deformation of either the leader block 60 or the tape clamp 62, a final position of the tape clamp 62 relative to the leader block 60 can be precisely achieved on a repeatable basis. As a result, an overall thickness of the leader block assembly 28 is readily controlled during mass production.

FIG. 6B further illustrates the clearance 124 between the leader block 60 and the tape clamp 62 as described above. In one preferred embodiment, the clearance 124 is reduced at a tape exit point 126 to eliminate the potential for impressions being formed into the storage tape 26 (FIG. 2) during use (e.g., when the leader block assembly 28 is inserted into a take-up reel (not shown) and the storage tape 26 wound around the take-up reel). This reduction in the clearance 124 is preferably provided by a shoulder formed by the tape clamp 62. Alternatively or in addition, the leader block 60 can be modified to reduce the clearance 124 at the tape exit point 126.

Figure 7:
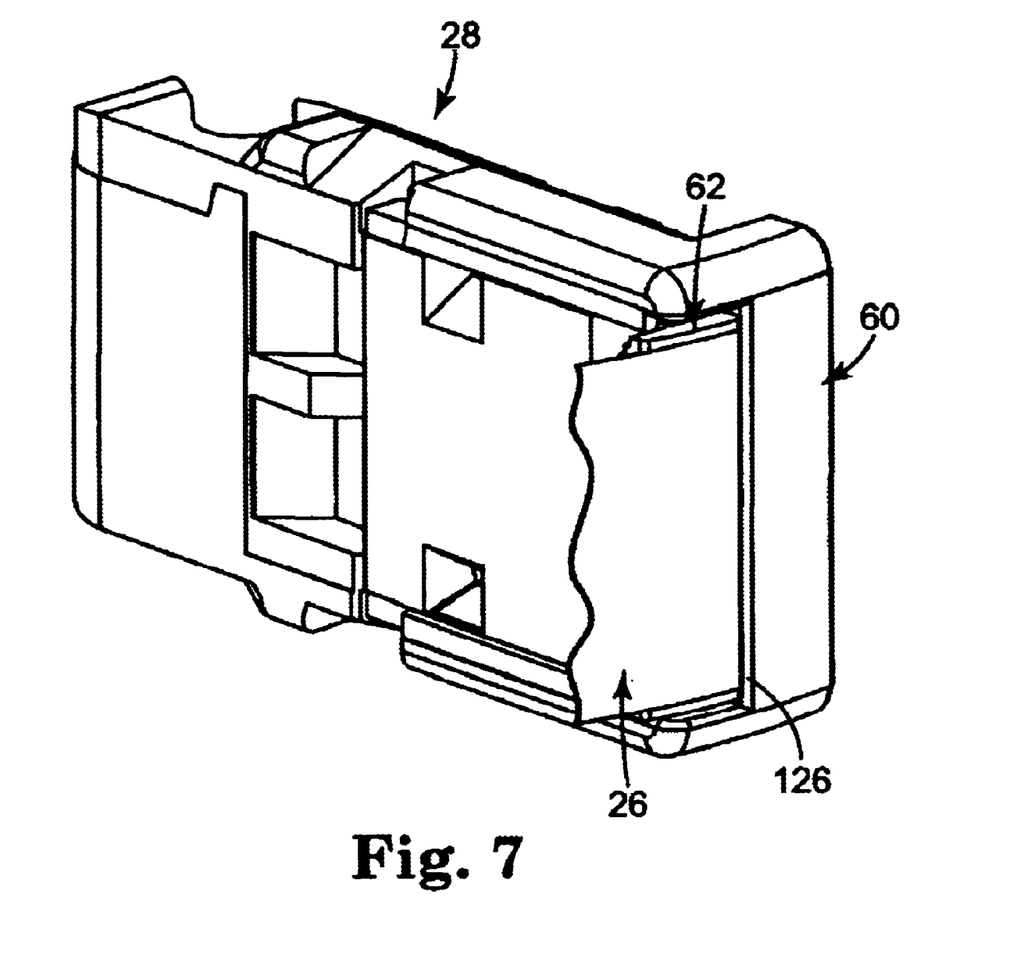
FIG. 7 is a perspective view of the leader block assembly of FIG. 5 securing a storage tape.

An additional, preferred feature of the leader block assembly 28 is best illustrated by FIG. 7 in which the storage tape 26 is shown secured to the leader block assembly 28. In particular, the storage tape 26 is secured between the leader block 60 and the elastomeric member 64 (FIG. 6B), as well as between the leader block 60 and the tape clamp 62. Once again, the storage tape 26 extends from the leader block assembly 28 at the tape exit point 126. In a preferred embodiment, the tape clamp 62 is formed to have a width greater than a width of the storage tape 26 in at least a region of interface with the storage tape 26 (e.g., the tape exit point 126). By preferably providing this increased width, lateral edges of the tape clamp 62 (that might otherwise include minor defects resulting from a plastic molding process and part handling) will not contact the storage tape 26, thereby virtually eliminating the potential for tearing of the storage tape 26 due to contact with the tape clamp 62.

The leader block assembly of the present invention provides a marked improvement over previous designs. By employing cantilevered legs, a positive engagement between the tape clamp and the leader block can be achieved on a consistent basis. The cantilevered legs are configured to deflect during assembly, but readily return to a desired position and are not permanently deformed. Further, the elastomeric member ensures that long term interlocking between components is achieved.

Although the present invention has been described with reference to preferred embodiments, workers skilled in the art will recognize that changes can be made in form and detail without departing from the spirit and scope of the present invention.

What is claimed is:

1. A leader block assembly for holding an end of a storage tape, the leader block assembly comprising:

a leader block defining a leading section and a trailing section, the trailing section forming a channel defined by opposing sidewalls extending from a base, wherein each of the opposing sidewalls forms a lip opposite the base, each lip having an under surface;

a tape clamp nested within the channel and including a bottom surface and opposing sidewalls each having at least one cantilevered leg extending upwardly relative to the bottom surface; and an elastomeric member disposed between the leader block and the tape damp for biasing the tape clamp to a locked state in which the legs engage the under surface of the respective lip.

2. The leader block assembly of claim 1, wherein the tape clamp includes a first pair of upwardly extending legs at a first one of the opposing sides and a second pair of upwardly extending legs at another of the opposing sides.

3. The leader block assembly of claim 2, wherein the elastomeric member is a pad sized to extend across a width of the tape clamp, and further wherein a first end of the pad is positioned between the first pair of upwardly extending legs.

4. The leader block assembly of claim 3, wherein the bottom surface defines a slot configured to receive the pad.

5. The leader block assembly of claim 1, wherein the tape clamp further includes a central body and further wherein each leg extends from a fixed end attached to the central body in an angularly outward fashion to a free end such that the free end is transversely offset from the respective fixed end.

6. The leader block assembly of claim 5, wherein each leg is configured to inwardly deflect from an unloaded position relative to the central body during assembly to the leader block and elastically return to the unloaded position upon final assembly.

7. The leader block assembly of claim 6, wherein the central body forms a cavity about each leg for allowing inward deflection of the respective leg.

8. The leader block assembly of claim 5, wherein each free end forms an engagement surface, and further wherein the engagement surface and a corresponding under surface are configured to be co-planar upon final assembly.

9. The leader block assembly of claim 8, wherein a plane of each respective engagement surface is non-parallel relative to a plane defined by the bottom surface in transverse cross-section.

10. The leader block assembly of claim 9, wherein the plane of each respective engagement surface and the plane of the bottom surface defines an included angle in the range of 5°–15° in transverse cross-section.

11. The leader block assembly of claim 1, wherein the leader block assembly is configured to affix an end of a storage tape between the elastomeric member and the leader block.

12. A data storage tape cartridge comprising:

a housing defining an enclosure;

at least one tape reel assembly disposed within the enclosure, the tape reel assembly including a hub;

a storage tape wrapped about the hub; and a leader block assembly secured onto a leading end of the storage tape, the leader block assembly including:

a leader block defining a leading section and a trailing section, the trailing section forming a channel defined by opposing sidewalls extending from a base, wherein each of the opposing sidewalls forms a lip opposite the base, each lip having an under surface, a tape clamp nested within the channel, the tape clamp including a bottom surface and opposing sides each having at least one cantilevered leg extending upwardly relative to the bottom surface, an elastomeric member disposed between the leader block and the tape clamp for biasing the tape clamp to a locked position in which the legs engage the under surface of the respective lip and the leading end of the storage tape is secured to the leader block assembly.

13. The data storage tape cartridge of claim 12, wherein the tape clamp includes a first pair of upwardly extending legs at a first one of the opposing sides and a second pair of upwardly extending legs at another of the opposing sides.

14. The data storage tape cartridge of claim 12, wherein the tap clamp farther includes a central body, and further wherein each leg extends from a fixed end attached to the central body in an angularly outward fashion to a free end such that the free end is transversely offset from the respective fixed end.

15. The data storage tape cartridge of claim 14, wherein each leg is configured to inwardly deflect from an unloaded position relative to the central body during assembly to the leader block and elastically return to the unloaded position upon final assembly.

16. The data storage tape cartridge of claim 14, wherein each free end terminates in an engagement surface, and further wherein each engagement surface and corresponding under surface are configured to be co-planar upon final assembly.

17. The data storage tape cartridge of claim 16, wherein a plane of each respective engagement surface is non-planar relative to a plane defined by the bottom surface in transverse cross-section.

18. The data storage tape cartridge of claim 17, wherein the plane of each respective engagement surface and the plane of the bottom surface defines an included angle in the range of 5°–15° in transverse cross-section.

19. A method of assembling a leader block assembly for securing a leading end of a storage tape, the method comprising:

providing a leader block forming a channel defined by opposing sidewalls extending from a base, each sidewall forming a lip opposite the base and having an under surface;

providing a tape clamp including a central body, defining a bottom surface and opposing sides, and at least one cantilevered leg extending upwardly relative to the bottom surface at each of the respective sides;

providing an elastomeric member;

positioning the elastomeric member at the bottom surface of the tape clamp;

positioning the tape clamp adjacent the channel;

directing the bottom surface of the tape clamp toward the base of the leader block, wherein the legs deflect inwardly along the lips; and achieving a final assembly position in which the tape clamp is nested within the channel and the legs elastically return to an unloaded position, wherein the elastomeric member biases the tape clamp to a locked state in which the legs engage the under surface of the respective lip.

20. The method of claim 19, wherein each leg defines a free end, and further wherein directing the tape clamp into the channel further includes aligning a plane of each free end with a plane of the respective under surface in the locked state.

* * * * *

UNITED STATES PATENT AND TRADEMARK OFFICE
CERTIFICATE OF CORRECTION

PATENT NO. : 6,698,675 B2  Page 1 of 1
DATED : March 2, 2004
INVENTOR(S) : Jerome D. Brown et al.

It is certified that error appears in the above-identified patent and that said Letters Patent is hereby corrected as shown below:

Column 9,
Line 28, "damp" should read -- clamp --.

Column 10,
Line 34, "tap" should read -- tape --.

Signed and Sealed this

Sixteenth Day of November, 2004

JON W. DUDAS
*Director of the United States Patent and Trademark Office*